Figure 1:
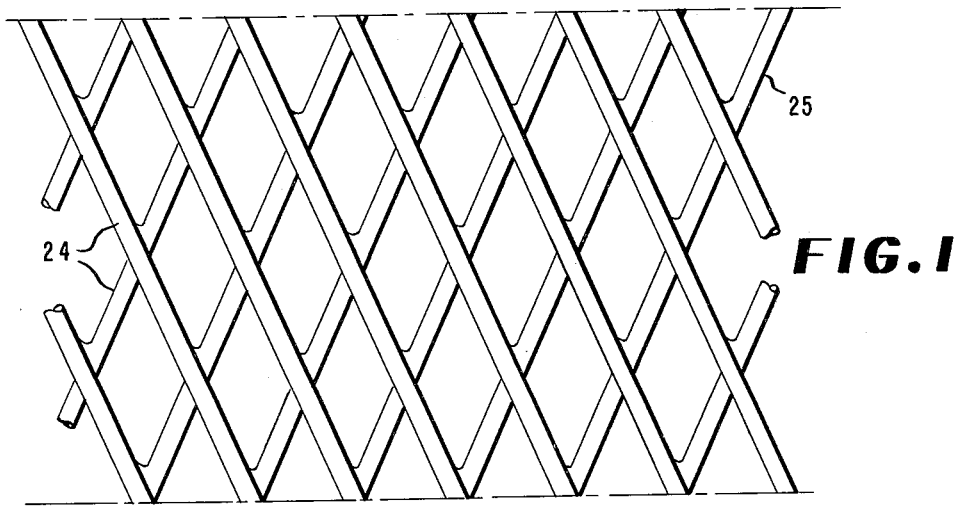

Sept. 4, 1962 F. B. MERCER 3,051,987
APPARATUS AND METHOD FOR PRODUCTION OF
THERMOPLASTIC NET-LIKE FABRICS
Filed March 6, 1961 5 Sheets-Sheet 1

INVENTOR
FRANK BRIAN MERCER

BY

ATTORNEY

Sept. 4, 1962 F. B. MERCER 3,051,987
APPARATUS AND METHOD FOR PRODUCTION OF
THERMOPLASTIC NET-LIKE FABRICS
Filed March 6, 1961 5 Sheets-Sheet 3

INVENTOR
FRANK BRIAN MERCER

BY *A. Ralph Snyder*
ATTORNEY

Sept. 4, 1962  F. B. MERCER  3,051,987
APPARATUS AND METHOD FOR PRODUCTION OF
THERMOPLASTIC NET-LIKE FABRICS
Filed March 6, 1961   5 Sheets-Sheet 4

INVENTOR
FRANK BRIAN MERCER

BY *A. Ralph Snyder*

ATTORNEY

൧

3,051,987
APPARATUS AND METHOD FOR PRODUCTION
OF THERMOPLASTIC NET-LIKE FABRICS
Frank Brian Mercer, Blackburn, England, assignor to Plastic Textile Accessories Limited, Blackburn, England
Filed Mar. 6, 1961, Ser. No. 93,647
Claims priority, application Great Britain Mar. 9, 1960
8 Claims. (Cl. 18—12)

This invention relates to an improvement in or modification of the method and apparatus for treating the extruded plastic net or net-like fabric as produced, for example, according to my prior Patent No. 2,919,467 in which the strands and intersections or junctions of the net or net-like fabric (hereinafter referred to as "net" or "netting") are extruded through sets of die orifices distributed in a pair of slideway die-carrying members which are relatively displaced, in a direction transverse to that of extrusion, through positions which, during the continuous extrusion of the plastic, alternately place the die orifices in registration and non-registration with one another with the result that the net is produced in a single operation as an integral extruded entity.

The die orifices in the die-carrying members may be of a form such that when the die orifices in each member are in registration single composite die orifices are formed through which integral net intersections or junctions are extruded as described in the above patent, or alternatively of a known form in which the die orifices in one member are at all times separate and distant from those in the other die member (i.e. composite orifices are not formed) but are closely spaced from one another, the net intersections or junctions being formed externally of the die orifices by a coming-together and conjoining of the strands as the die orifices pass into and out of register.

In the above patent is also described the application of a degree of tension or drafting to the finished net (i.e. after the extruded plastic has been set or fixed) which stretches the strands while having little or no effect upon the net intersections or junctions. This tensioning operation produces a strengthening of the net by molecular orientation in the strands similar to that well known in the tensioning or drafting of plastic monofilaments.

In practice, it has been found that by extruding the plastic through die orifices which are wider in the direction of displacement than in the direction at right angles thereto, the application of tensioning by the hauloff rolls takes effect upon the extruded plastic before it has been cooled or otherwise set and may produce in each mesh strand, by stretching, a neck or waist intermediate the net intersections such that elongation and molecular orientation in the strands tends to take place outwardly from said necks.

The object of the present invention is to provide a method and apparatus whereby it is ensured that appropriate necks are produced in the mesh strands before the plastic has been set or fixed and are located in a predetermined position in the strands (i.e. midway between the intersections) such that the subsequent stretching and molecular orientation thereof by the applied tension is predisposed to take place equally on both sides of said necks and towards the intersections, irrespective of the dimensions of the dies or other conditions of extrusion operations, although the invention will be found to be more particularly useful where the larger strand gauge nets are produced.

The present invention consists in varying the tension applied to the extruded net before setting or fixing of the plastic such that, in order to produce said necks in the mesh strands, tension increases occur only during those periods (and more or less midway in those periods) when the respective dies of the sets are cut out of register with one another, or, in other words, while the die orifices are traversing the midway portion of the lands which separate the die orifices of either set.

The variation in the tension applied to the net as it emerges from the die orifices is timed to occur cyclically in synchronism with the non-registration periods of the orifices whereby the net is subjected to a momentary increase in tension only when net strands are being formed, preferably at the moment of mid-strand extrusion, and easement of tension during extrusion of the net intersections.

This cyclic variation of the tension may be accomplished in one of the following fundamental ways.

(a) Cyclically varying the peripheral speed of the haul-off rollers;

(b) Cyclically varying the distance between the die orifices and the nip of the haul-off rollers;

(c) Cyclically varying the length of the path along which the net travels between the die orifices and the haul-off rollers, or (d) Cyclically applying a supplementary haul-off tension to the net by means additional to the haul-off rollers, such that the additional means only engage and apply supplementary tension to the net during net-strand extrusion and are disengaged from the net during net-intersection extrusion.

The further stretching of the net, after necking, to produce molecular orientation may be carried out between the position of the haul-off rolls and the net-reeling rolls or collecting means, or the molecular orientation may be carried out after reeling-in, as a separate operation. The stretching for molecular orientation may be done between pairs of rollers, the second pair rotating at somewhat greater peripheral speed than the first pair in a manner known for the molecular orientation treatment of monofilaments.

The abovementioned cyclic variation in tension of the net as it is extruded may be brought about by any suitable mechanism of which the following are examples:

(a) Cyclic variation of the rotational speed of the haul-off rollers may be accomplished by inserting, between the roller drive shaft and the constant speed rotational drive for the rollers, means for cyclically imposing an increment of acceleration to the shaft while the latter is being continuously rotated from the constant speed source. Such accelerating means may comprise oscillatory crank means couplable by clutch means to the roller drive shaft for one direction of clutch throw only (i.e. while the clutch is moving in the same direction as the roller drive shaft), the crank means being driven so that during its throw it moves at a greater angular speed than the roller shaft.

Alternatively the accelerating means may comprise an epicyclic gear train inserted in the drive between the constant speed rotation drive source and the roller shaft and means for cyclically controlling the reaction gear of the epicyclic gear train such that the reaction gear is cyclically driven against the reaction force momentary periods whereby during such periods the drive ratio of the epicyclic gear train is altered to accelerate the speed of the output to the roller shaft.

(b) The haul-off rollers and/or the extrusion head may be oscillated or vibrated bodily so that the distance between the die orifices and the nip of the haul-off rollers varies cyclically, the distance increasing during the extrusion of net strands and decreasing during the extrusion of the net intersections.

(c) The length of the path along which the net travels between the die orifices and the nip of the haul-off rollers may be cyclically varied by leading the net over a deflecting roller or like means located between the die orifices and the haul-off rollers and cyclically reciprocating the deflecting roller or other means transversely to the path of the net in timed relationship to the extrusion of net strands from the die orifices.

(d) The haul-off tension applied to the net as it is extruded may be cyclically varied by the provision of supplementary haul-off rollers intermediate the die orifices and the ordinary haul-off rollers, the supplementary haul-off rollers being driven at a higher peripheral speed than the ordinary haul-off rollers but arranged so as to engage the net only at spaced intervals of time so corresponding to the intervals at which successive rows of net strands are extruded from the die orifices. This cyclic, interrupted, engagement of the net by the supplementary haul-off rollers may conveniently be achieved by the use of non-circular surface rollers, e.g. elliptical rollers or rollers having an interrupted circumference so that a nip is formed between such rollers only at intervals in their rotation.

Figure 2:
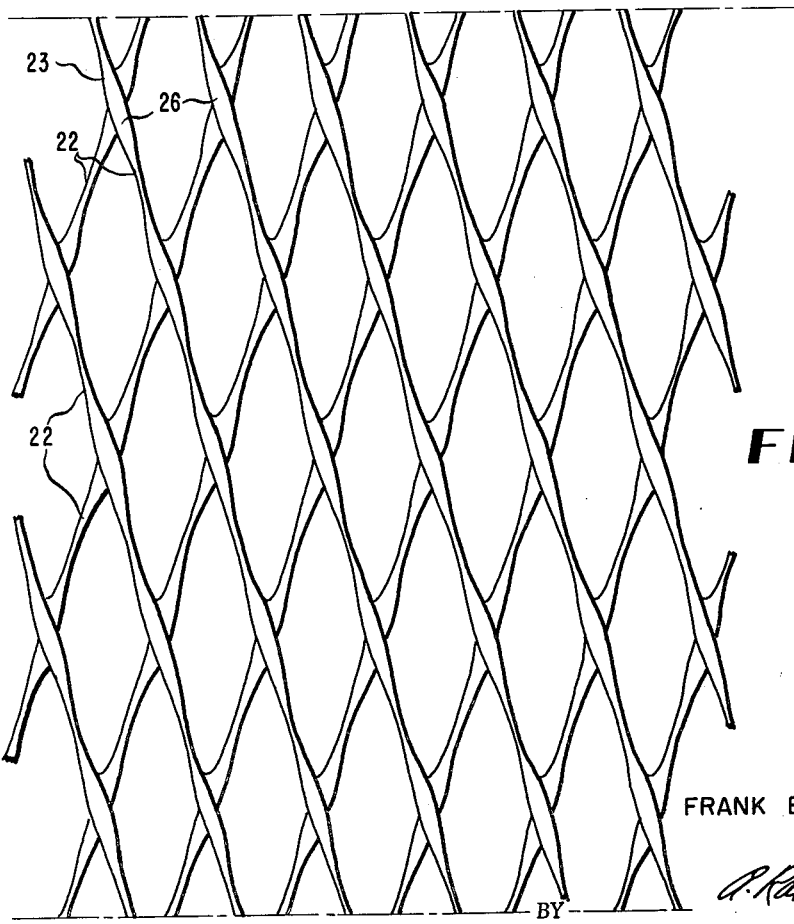
Figure 3:
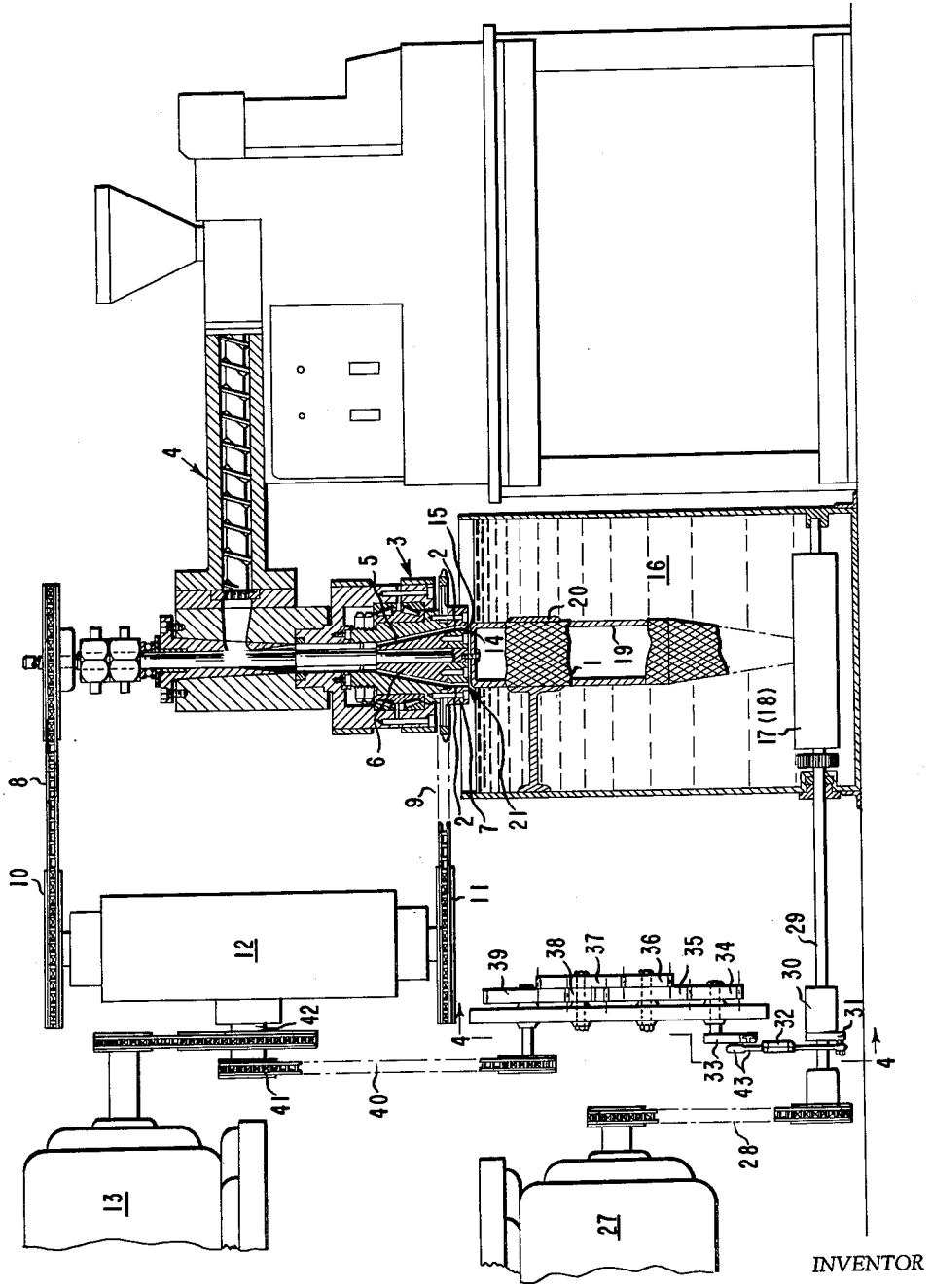
Figure 4:
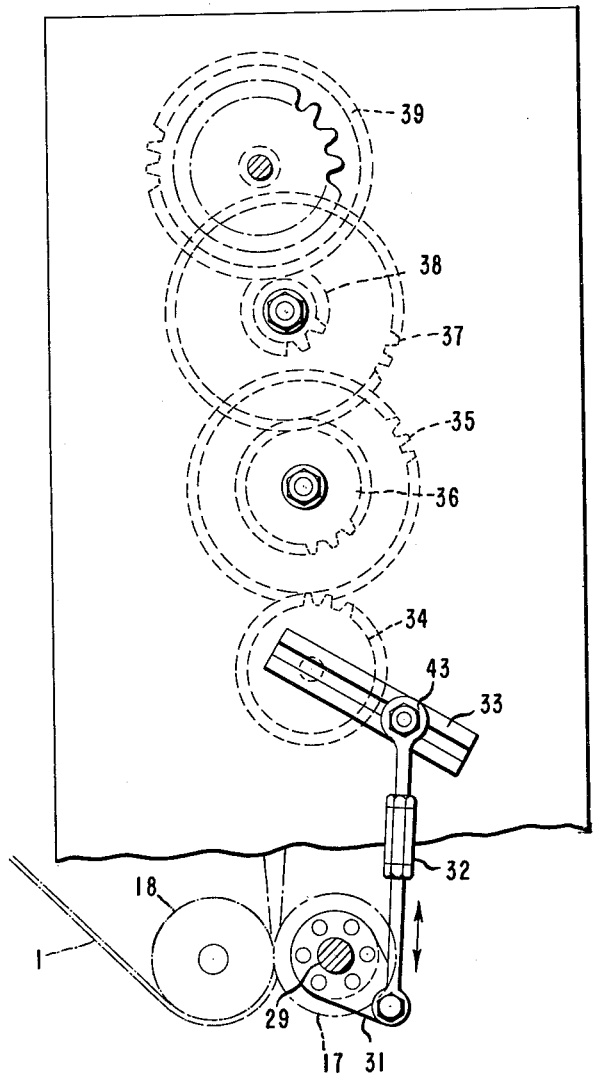
Figure 5:
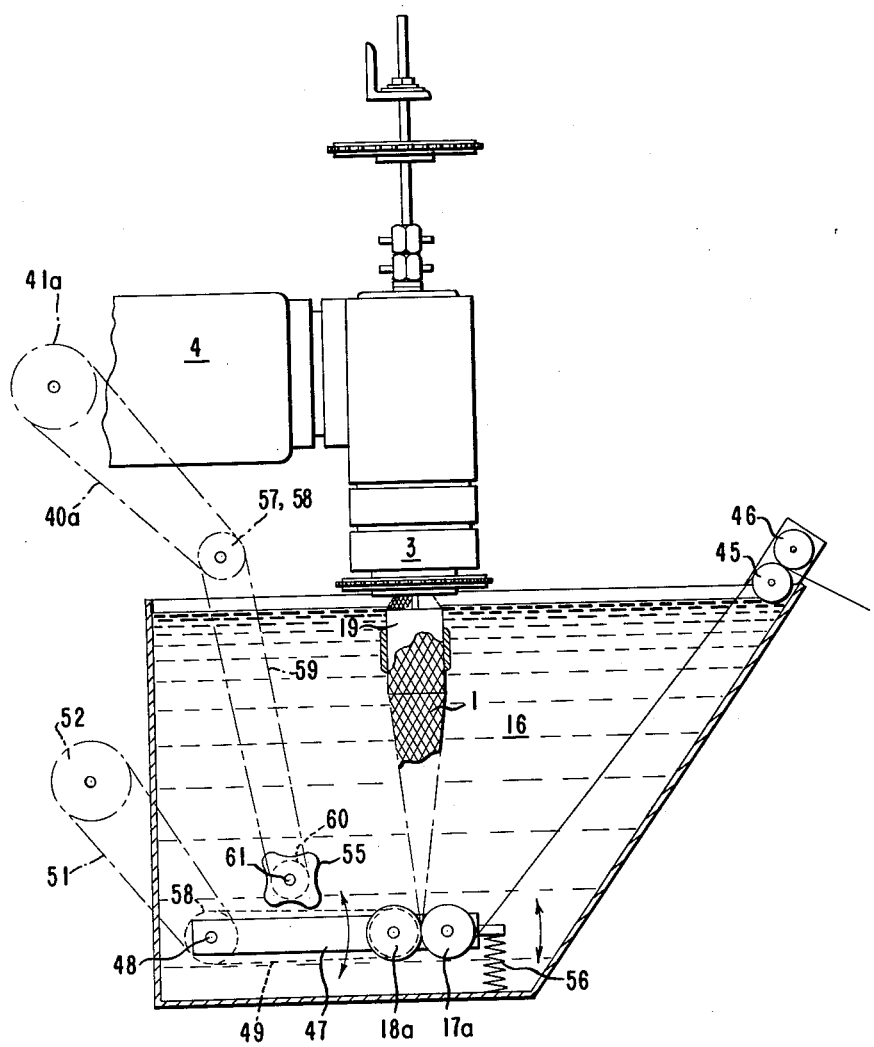
Figure 6:
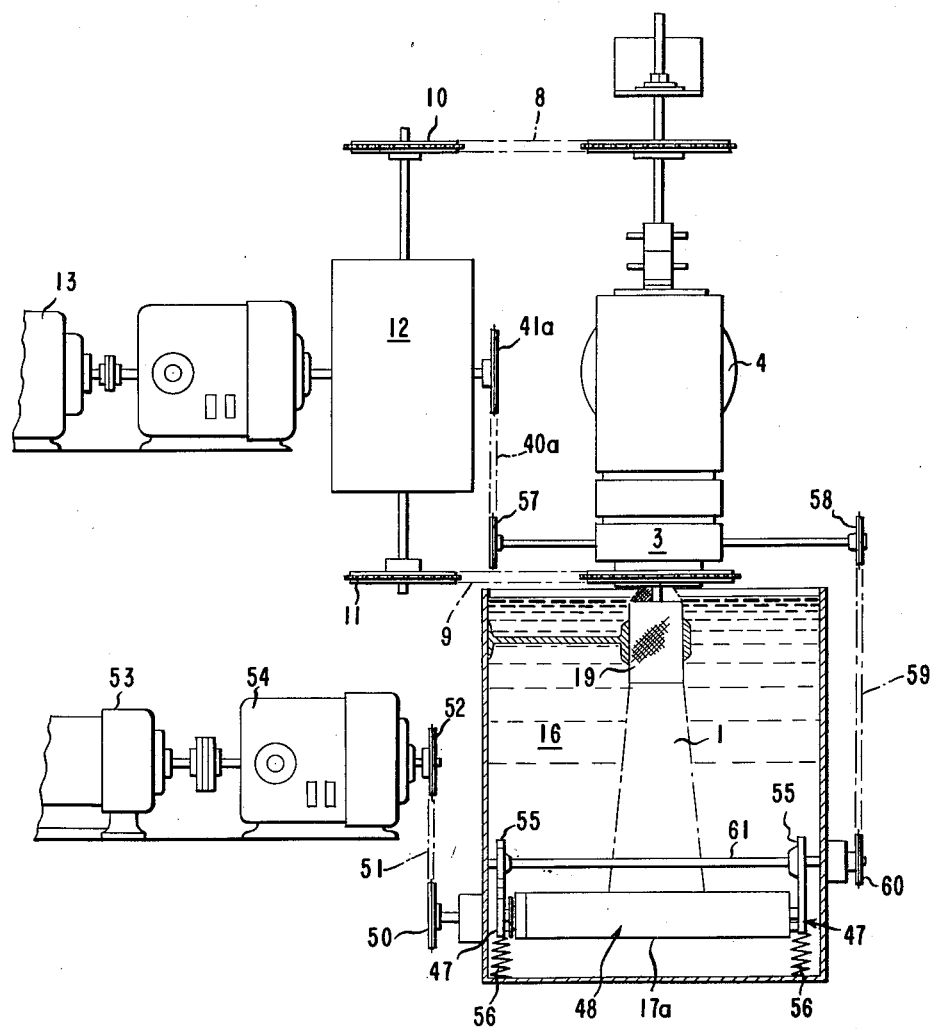

In the accompanying drawings:

FIGURE 1 shows net produced according to the aforesaid patent, but without having had applied thereto the necked forming process according to the present invention, FIGURE 2 shows a net produced similarly to that shown in FIGURE 1 but having had the neck forming process according to the present invention applied thereto, FIGURE 3 is a side elevation, partly in section, of the apparatus for extruding net and for forming necks therein, according to one form of the present invention, and FIGURE 4 is a view of part of the apparatus shown in FIGURE 3, viewed in the direction of the arrows 4—4 in FIGURE 3, FIGURES 5 and 6 show diagrammatic front and side elevations of an alternative form of apparatus for forming necks in extruded net.

In carrying the invention into effect according to one mode by way of example, see FIGURES 3 and 4, in which cyclic variation is applied to the extruded net by varying the rotational speed of the haul-off rollers (mode (a) above), net 1 is extruded from die orifices 2 of an extrusion head 3, for example, as described and illustrated in the aforementioned patent. This extrusion head 3 and its ancillary apparatus comprises in its essentials a screw extruder 4 which forces plastic under pressure into the annular space 5 between a central circular die member 6 and an annular die member 7 in the extrusion head 3. The central die member 6 and the annular die member 7 are rotated in opposite directions by means of drives applied thereto by drive chains 8 and 9 from the sprockets 10 and 11 of a gear box 12 driven from an electric motor 13. The die members 6 and 7 have a common slideway 14 providing a bearing therebetween and each have the die orifices 2 referred to above, for example, in the form of grooves or like orifices 15 extending therethrough and opening out on to the common slideway such that when the orifices are in registration to form composite orifices integral net intersections are formed and when the orifices are out of register net strands are formed, as already set forth in the aforementioned patent, or alternatively in the form of tubes or bores extruding through the die members adjacent the common slideway and terminating in die orifices just clear of the slideway such that as the die orifices are passing into and out of register the extruded strands are conjoined to form the net intersections externally of the die means. In connection with the present invention, the two die members 6 and 7 have an equal number of equally spaced die orifices, in order to ensure that each row of net intersections around the net tube are formed simultaneously.

The extruded net passes into a setting bath 16 and is hauled off by a pair of haul-off rollers 17 and 18 situated at or towards the bottom of the setting bath. In the setting bath, a cylindrical former 19 is suspended from the central die member 6 to receive the net as it is extruded and the former 19 has a short surrounding sleeve 20 fixed to the side structure of the apparatus. The sleeve 20 applies a slight drag to the net so that the net is not unduly distorted by the tension applied by the haul-off rollers 17 and 18.

According to one preferred form of causing the net to experience a variation in tension as it is extruded and before the plastic has set, so that necks are produced in the net strands, the haul-off rollers 17 and 18 are rotated as a pair at variable speed so that at the moment of extrusion of net strands, preferably at the mid-strand point, the rate of rotation of the paired rolls is momentarily speeded up so that an increased tension is applied to the net during that moment. This momentary increase in tension is transmitted through the already set net to the zone 21 immediately after the die orifices 15, so that, since the net is not set in this zone, the net strands stretch to produce necks, as shown at 22 in FIGURE 2. The formation and order of dimension of the necks 22 may be seen by comparing the necked net 23 in FIGURE 2 with the strands 24 of an unnecked net 25 shown by way of example in FIGURE 1, the net intersections 26 being substantially unaffected in necked net 23.

The rate of rotation of the haul-off rolls 17 and 18 may be varied, as described above, by any convenient means. In the example illustrated in FIGURE 3, the haul-off rolls 17 and 18 are driven from an electric motor 27 through a chain drive 28 to the roller drive shaft 29. Secured to this shaft is a one-way clutch device 30 such as a sprag clutch, through which momentary semi-rotational increments of accelerated drive may be cyclically applied to the shaft 29. To this end, there is journalled on the shaft 29 a crank 31, which is coupled to the shaft 29 by the clutch device 30 when the crank 31 is throwing (as hereinafter described) in the same rotational direction as the drive direction of the shaft 29 driven by the motor 27.

The crank 31 is oscillated, i.e. is semi-rotated by being coupled with a connecting rod 32 to a fully rotary crank 33, driven through a chain of gears 34 to 39 by a sprocket chain drive 40 from a sprocket wheel 41 on the input shaft 42 of the gear box 12 from which the dies 6 and 7 are rotated. Thus the rotation of the crank 33 and oscillation of the crank 31 is in timed relation to the rotation of the dies and the speed of throw of the crank 33 (and therefore the crank 31) and the throw frequency of the crank 31 in respect of the frequency of actual die orifice registration of the die orifices 2 in the die members 6 and 7 are governed by the ratio of the gear train 34 to 39. Further the length of throw imparted to the crank 31 can be adjusted by adjusting the point of connection 43 of the connecting rod 32 on the driven crank 33. In this manner each acceleration increment applied to the drive shaft 29 of the haul-off rolls 17 and 18 can be timed to take place as each row of net strands are extruded wherby the net is subjected to momentary increases of haul-off tension only during net strand extrusion and not when intersections are being extruded with the result that the necks 22 (FIGURE 2) are only produced in the net strands, preferably at the mid-point of the strands.

FIGURES 5 and 6 show an alternative form of device for cyclically varying the tension applied to the net as it is extruded in order to produce the aforementioned necks in the mesh strands. In this form the haul-off rollers are oscillated bodily so that the distance between the die orifices of the extrusion head and the nip of the haul-off rollers varies cyclically (mode (b) above).

In FIGURES 5 and 6 the same references are used as in FIGURE 3 where corresponding or similar parts of the device are concerned, and the apparatus for, and mode of, extruding the net is as described with reference to FIGURE 3.

The net 1 extruded as described above from the extrusion head 3 passes into the setting bath 16 being led over the former 19. At or near the bottom of the setting bath 16, the net passes into the nip of a pair of haul-off rollers 17a and 18a and thence back out of the bath 16 through a pair of draw-off rollers, 45 and 46.

The haul-off rollers 17a and 18a are rotatably mounted between the ends of a pair of swing arms 47 pivotally mounted on the bath structure on the axis 48, and are driven by chain or equivalent drive means 49 from a sprocket wheel 50 freely mounted on the pivotal axis 48, the sprocket wheel 50 being in turn driven by chain drive 51 from a sprocket wheel 52 rotated at presettable speed by an electric motor 53 driving through a variable speed gear device 54.

In order to provide for the desired cyclic variation of tension in the net 1 as it is extruded, the haul-off rollers 17a and 18a are oscillated up and down by means of rotary lobed cam means 55 which engage the swing arms 47, and spring means 56 urge the swing arms 47 upwardly against the cam means 55.

The cam means 55 are rotated at a speed which will cause cyclic oscillation of the haul-off rollers 17a and 18a in synchronism with the rotation of the extrusion die means and to this end the cam means 55 are driven from the gear box 12 which also drives the die means, the drive, as shown, being from a sprocket wheel 41a on the gear box 12 through a chain drive 40a to a sprocket wheel 57 and then from a sprocket wheel 58 by a chain drive 59 to a sprocket wheel 60 on the shaft 61 carrying the cam means 55.

The oscillating throw of the haul-off rollers 17a and 18a can be altered as required by changing the cam means 55.

I claim:

1. In the method of manufacturing an integral plastic net-like structure comprising, in combination, the steps of continuously extruding plastic material to form alternately mesh strands and mesh strand intersections forming an integral net-like structure, continuously passing the freshly extruded net-like structure under a draw-off tension in the direction of extrusion through a setting zone wherein said plastic material is hardened, and thereafter stretching said structure in at least one direction to elongate the same; the improvement which comprises momentarily increasing the draw-off tension at substantially the midpoint of extrusion of each mesh strand whereby to form substantially midway of each mesh strand a length of reduced cross section.

2. In the method of manufacturing an integral plastic net-like structure composed of mesh strands and mesh strand intersections comprising, in combination, the steps of extruding each intersection through cooperating extrusion orifices as integral unitary intersection-forming streams of plastic material, continuing the extrusion while dividing each intersection-forming stream about a surface of separation parallel to the opposite faces of the net-like structure when laid flat to form separate mesh strand-forming streams, reuniting the strand-forming streams into further unitary intersection-forming streams, the division of said intersection-forming streams and the separation into strand forming streams and the reuniting into further intersection-forming streams being effected by relatively displacing said streams transversely to the direction of extrusion and continuously repeating the separation and reuniting of said streams to thereby extrude the net-like structure as an integral entity, continuously passing said net-like structure under a draw-off tension in the direction of extrusion through a setting zone whereby to harden said plastic material, and thereafter subjecting said net-like structure to tension in at least one direction to elongate the strands thereof; the improvement which comprises, in combination, the step of subjecting the net-like structure to a momentary increase in draw off tension at substantially the midpoint of extrusion of each strand-forming stream whereby a length of reduced cross-section is produced substantially midway of each strand.

3. In apparatus for continuously extruding a plastic net-like structure comprising, in combination, extrusion die means for continuously extruding plastic material alternately in the form of mesh strands and mesh strand intersections forming an integral plastic net-like structure, means for setting the freshly extruded net-like structure, haul-off means for continuously drawing said structure under draw-off tension from said die means in the direction of extrusion and through said setting means, and means for stretching said structure in at least one direction to elongate the same; the improvement which comprises, in combination, means for momentarily increasing the draw-off tension at substantially the midpoint of extrusion of each mesh strand.

4. In apparatus for continuously extruding a plastic net-like structure as an integral extruded entity comprising, in combination, a pair of displaceable die-carrying means each having a contacting surface, the surface of one die-carying means sliding upon the surface of the other die-carrying means, said surfaces extending in the direction of extrusion and transversely thereof, said die-carrying means having sets of cooperating complementary die-forming orifices provided therein and adapted to be fed with plastic material under pressure, means supporting said die-carrying means for relative displacement transverse to the direction of extrustion while maintaining said surfaces in sliding contact, means for relatively displacing the die-carrying means so that the orifices of the respective sets are moved into and out of registration one with another during extrusion, means for setting freshly extruded plastic net-like structure, and haul-off means for continuously passing freshly extruded net-like structure under draw-off tension from said die-carrying means and through said setting means, and means for stretching said net-like structure in at least one direction to elongate the same; the improvement which comprises, in combination, means for momentarily increasing the draw-off tension at substantially the time the respective orifices attain a maximum out-of registration position.

5. Apparatus as claimed in claim 4, wherein said haul-off means comprises positively driven, cooperative pinch rolls operative to draw said net-like structure through the nip between the rolls in the direction of extrusion at a linear speed in excess of the linear speed of extrusion, and means for cyclically increasing the peripheral speed of said pinch rolls whereby to increase momentarily the draw-off tension at substantially the midpoint of extrusion of each mesh strand.

6. Apparatus as claimed in claim 4 wherein said haul-off means comprises positively driven, cooperative pinch rolls operative to draw said net-like structure through the nip between the rolls in the direction of extrusion at a linear speed of extrusion, and means for cyclically varying the distance between the nip of the pinch rolls and the die orifices whereby to increase momentarily the draw-off tension at substantially the midpoint of extrusion of each mesh strand.

7. Apparatus as claimed in claim 4 wherein said haul-off means comprises positively driven cooperative pinch rolls operative to draw said net-like structure through the nip between the rolls in the direction of extrusion at a linear speed of extrusion, and means for cyclically varying the length of the path over which said net-like structure passes between the die orifices and the nip of said pinch rolls whereby to increase momentarily the draw-off tension at substantially the midpoint of extrusion of each mesh strand.

8. In the method of manufacturing an integral plastic net-like structure composed of mesh strands and mesh strand intersection comprising, in combination, the steps of extruding mesh strand-forming streams of plastic material in two concentric circular series at close radial spacing containing the extrusion while displacing said stream series relative to one another about the common axis, whereby the streams of one series cross and unite with the streams of the other series to form mesh intersection after extrusion has taken place, separating said streams to again form mesh strand-forming streams by continuance of said relative displacement followed by again re-uniting said streams to form the next successive mesh intersections and repeating said uniting and separating through said relative displacement to form thereby an integral net-like structure continuously passing said net-like structure under a draw-off tension in the direction of extrusion through a setting zone whereby to harden said plastic material, and thereafter subjecting said net-like structure to tension in at least one direction to elongate the strands thereof; the improvement which comprises, in combination the step of subjecting the net-like structure to a momentary increase in draw-off tension at substantially the midpoint of extrusion of each strand-forming streams whereby a length of reduced cross-section is produced substantially midway of each strand.

References Cited in the file of this patent

UNITED STATES PATENTS

| | | |
|---|---|---|
| 2,919,467 | Mercer | Jan. 5, 1960 |
| 2,920,345 | Dyer | Jan. 12, 1960 |
| 2,932,850 | McNeill et al. | Apr. 19, 1960 |
| 2,984,889 | Braunlich et al. | May 23, 1961 |